(12) United States Patent
Zdenek et al.

(10) Patent No.: US 7,996,647 B2
(45) Date of Patent: Aug. 9, 2011

(54) ENHANCED MICROPROCESSOR OR MICROCONTROLLER

(75) Inventors: Jerrold S. Zdenek, Maricopa, AZ (US);
Joseph Julicher, Maricopa, AZ (US);
Sean Steedman, Phoenix, AZ (US);
Vivien Delport, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 478 days.

(21) Appl. No.: 12/178,249

(22) Filed: Jul. 23, 2008

(65) Prior Publication Data

US 2010/0023671 A1 Jan. 28, 2010

(51) Int. Cl.
*G06F 12/02* (2006.01)
(52) U.S. Cl. ............. 711/202; 711/5; 711/100; 711/173
(58) Field of Classification Search ............... 711/5, 100, 711/103, 173, 202
See application file for complete search history.

(56) References Cited

U.S. PATENT DOCUMENTS 7,287,145 B1 * 10/2007 Simeral et al. ............... 711/202

FOREIGN PATENT DOCUMENTS

EP 0 918 279 A2 5/1999
EP 0 992 887 A2 4/2000

OTHER PUBLICATIONS

International PCT Search Report, PCT/US2009/051251, 13 pages, Oct. 29, 2009.

\* cited by examiner

*Primary Examiner* — Jasmine Song
(74) *Attorney, Agent, or Firm* — King & Spalding L.L.P.

(57) ABSTRACT

A processor device has a data memory with a linear address space, the data memory being accessible through a plurality of memory banks. At least a subset of the memory banks are organized such that each memory bank of the subset has at least a first and second memory area, wherein no consecutive memory block is formed by the second memory areas of a plurality of consecutive memory banks. An address adjustment unit is provided which, when a predefined address range is used, translates an address within the predefined address range to access said second memory areas such that through the address a plurality of second memory areas form a continuous linear memory block.

26 Claims, 7 Drawing Sheets

ENHANCED MICROPROCESSOR OR MICROCONTROLLER

TECHNICAL FIELD

The technical field of the present application relates to microprocessors or microcontrollers.

BACKGROUND

Figure 1:
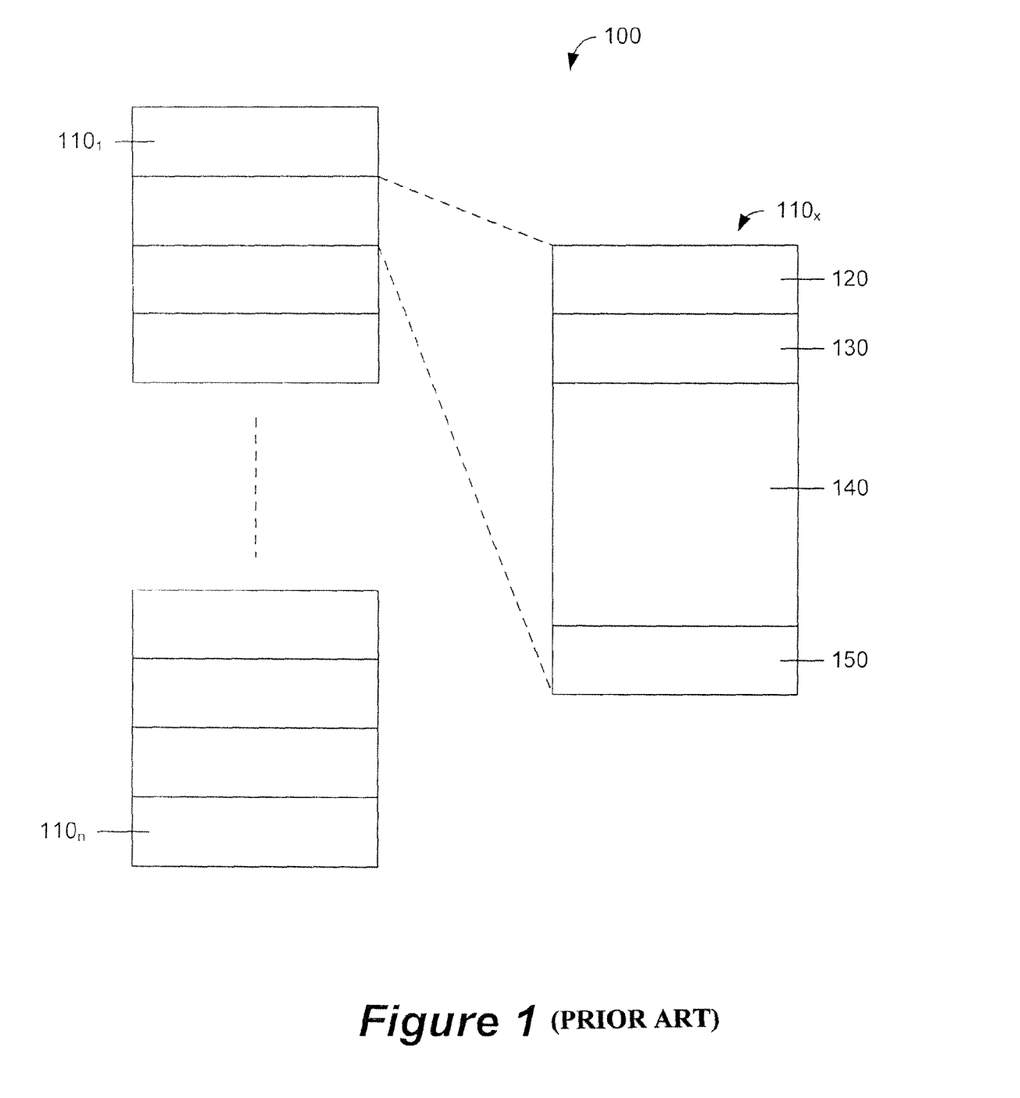
FIG. 1 shows a typical conventional memory banking scheme.

Microcontrollers generally constitute a system on a chip and comprise a microprocessor and a plurality of peripheral components. A wide variety of such microprocessor/microcontrollers exist having 8-bit, 16-bit and 32-bit architecture. Existing microprocessor/microcontrollers such as 8-bit microcontrollers manufactured by Microchip Technology Inc. provide for a flexible architecture. Such microprocessor/microcontrollers may comprise a Harvard architecture in which program and data memories are separated. Microprocessor/microcontrollers of this type further may comprise a specific banking system that allows access to the data memory. To this end, generally, the data memory is divided in a plurality of banks and a bank select register defines which of the banks is currently selected and accessible. To provide such a microprocessor/microcontrollers access to certain registers, such as a special function register, a register file, or any other register, the banking scheme may be designed to memory-map a plurality of such registers into most of the banks. Hence, a reduced number of memory locations within most banks is freely usable as a general purpose memory area. FIG. 1 explains this common concept more clearly. A physical memory space 100 is divided into a plurality of memory banks $110_1 \ldots 110_n$, wherein only one bank is generally accessible to a central processing unit at a time. On the right side of FIG. 1 a single exemplary memory bank and its exemplary structure is shown. For example, a first memory range 120 of bank $110_x$ may be memory mapped to common core special function registers (SFR) and adjacent or following memory area 130 to other SFRs used for peripherals. The following memory area 140 comprises general purpose registers (GPR) and memory area 150 is used for common memory. In one embodiment, such as an 8-bit microprocessor/microcontrollers each bank has 128 bytes and memory area 120 includes 12 common core SFRs, memory area 130 includes 20 SFRs, memory area 140 includes 80 GPRs and memory area 150 includes 16 bytes. Other implementations with a different memory mapping scheme of SFR or other registers may apply and depends on the architecture design.

Besides access to the memory 100 through this banking scheme, special function registers may be implemented that allow to indirectly access the whole or a bigger part of the linearized memory 100. However, the SFRs or in other implementations other registers which are memory-mapped to at least a plurality of banks do not allow for a single continuous larger memory area.

Hence, there exists a need for an improved architecture of a microprocessor/microcontrollers using a banking access scheme.

SUMMARY

According to an embodiment a processor device may comprise a data memory comprising a linear address space, the data memory being accessible through a plurality of memory banks, wherein at least a subset of the memory banks are organized such that each memory bank of the subset comprises at least a first and second memory area, wherein no consecutive memory block is formed by the second memory areas of a plurality of consecutive memory banks; and an address adjustment unit which, when a predefined address range is used, translates an address within the predefined address range to access said second memory areas such that through the address a plurality of second memory areas form a continuous linear memory block.

According to a further embodiment, the processor may further comprise an address decoder for activating the address adjustment unit. According to a further embodiment, the processor may further comprise a multiplexer having first and second inputs receiving an address and an adjusted address and being controlled by an address comparator receiving said address. According to a further embodiment, the first memory area may comprise special function registers. According to a further embodiment, the second memory area may comprise general purpose registers. According to a further embodiment, the second memory area may comprise common memory area. According to a further embodiment, the second memory area may comprise general purpose registers. According to a further embodiment, the processor may be a microcontroller or a microprocessor. According to a further embodiment, the first memory area may comprise core special function registers and each memory bank of the subset may comprises a third memory area comprising special function registers for peripheral devices. According to a further embodiment, the address adjustment unit may comprise a first decoder unit for accessing a column of memory cell array and a plurality of row decoder pairs, wherein each row decoder pair is associated with a row of the memory cell array and comprises a first row decoder and a second row decoder. According to a further embodiment, one of said row decoders may respond to said address. According to a further embodiment, each row decoder may output a row select signal which is combined through an OR gate coupled with the memory cell array.

According to another embodiment, a processor device may comprise a data memory comprising a linear address space, the data memory being accessible through a plurality of memory banks, a plurality of special function registers, wherein at least two special function registers are used to form a concatenated address; a predefined address space comprising a first address space to which a physical data memory is mapped and a second address space to which partial memory address areas of a plurality of memory banks are memory mapped in such a way that the partial memory address areas of the plurality of memory banks form a continuous linear memory block.

According to a further embodiment, the processor may further comprise an address adjustment unit translating an address addressing said liner memory block into a physical address. According to a further embodiment, a memory bank may include a first memory area comprising special function registers and a second memory area comprising general purpose registers and wherein said second memory area forms said partial memory address area. According to a further embodiment, a partial memory address area of a memory bank may comprise memory used as common memory area. According to a further embodiment, the processor may be a microcontroller or a microprocessor. According to a further embodiment, the data memory may be a memory cell array and the processor device may further comprise a first decoder unit for accessing a column of memory cell array and a plurality of row decoder pairs, wherein each row decoder pair is associated with a row of the memory cell array and comprises a first row decoder and a second row decoder. According to a further embodiment, the first row decoders may respond to addresses within said first address space and the second row decoders may respond to addresses within said second address space. According to a further embodiment, each row decoder outputs a row select signal which is combined through an OR gate coupled with the memory cell array.

According to another embodiment, a method of accessing data memory in a processor using a memory banking access scheme, may comprise the steps of: dividing a data memory into a plurality of memory banks, wherein a central processing unit accesses said data memory directly through one of said memory banks; and accessing a continuous memory block within said data memory indirectly through concatenated address registers, wherein the memory block is formed by a plurality of partial memory areas of at least a subset of memory banks which are non-continuous in a physical memory space but are mapped to a memory space in such a way that they form the continuous memory block.

According to a further embodiment, the subset may have less memory banks than the plurality of memory banks. According to a further embodiment, the continuous memory block may be formed by partial memory areas of all memory banks. According to a further embodiment, a memory bank may comprise a first memory area comprising special function registers and a second memory area comprising general purpose registers wherein the partial memory areas are formed by said second memory areas. According to a further embodiment, a partial memory area of a memory bank may comprise memory used as common memory area. According to a further embodiment, in at least the subset of memory banks, each memory bank may comprise special function registers, general purpose registers, and common memory area.

Other technical advantages of the present disclosure will be readily apparent to one skilled in the art from the following figures, descriptions, and claims. Various embodiments of the present application may obtain only a subset of the advantages set forth. No one advantage is critical to the embodiments.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

DETAILED DESCRIPTION

According to various embodiments, a microprocessor/microcontrollers comprises a physical address space with a plurality of memory banks arranged sequentially to form a linearized memory space and a virtual address space. According to another embodiment, a memory may be addressable under a plurality of addresses wherein a first address range has consecutive addresses that address sequential memory locations as used for normal banking and a second address range has consecutive addresses that at least partly address non-sequential memory locations used for accessing a linearized memory block. According to one embodiment, the address of the physical address space can be identical with a part of a virtual address space wherein the virtual address space is larger than the physical address space. In other words, the physical address space may be a subset of the virtual address space. According to an embodiment, certain sections within each bank of the physical address space are also memory mapped to another part of a second or virtual address space such that they form a continuous block of memory. In other words, even though the physical addresses of these blocks within each memory bank do not form a continuous block of memory, they do so in another part of a second or virtual memory space into which they are memory mapped.

Figure 3:
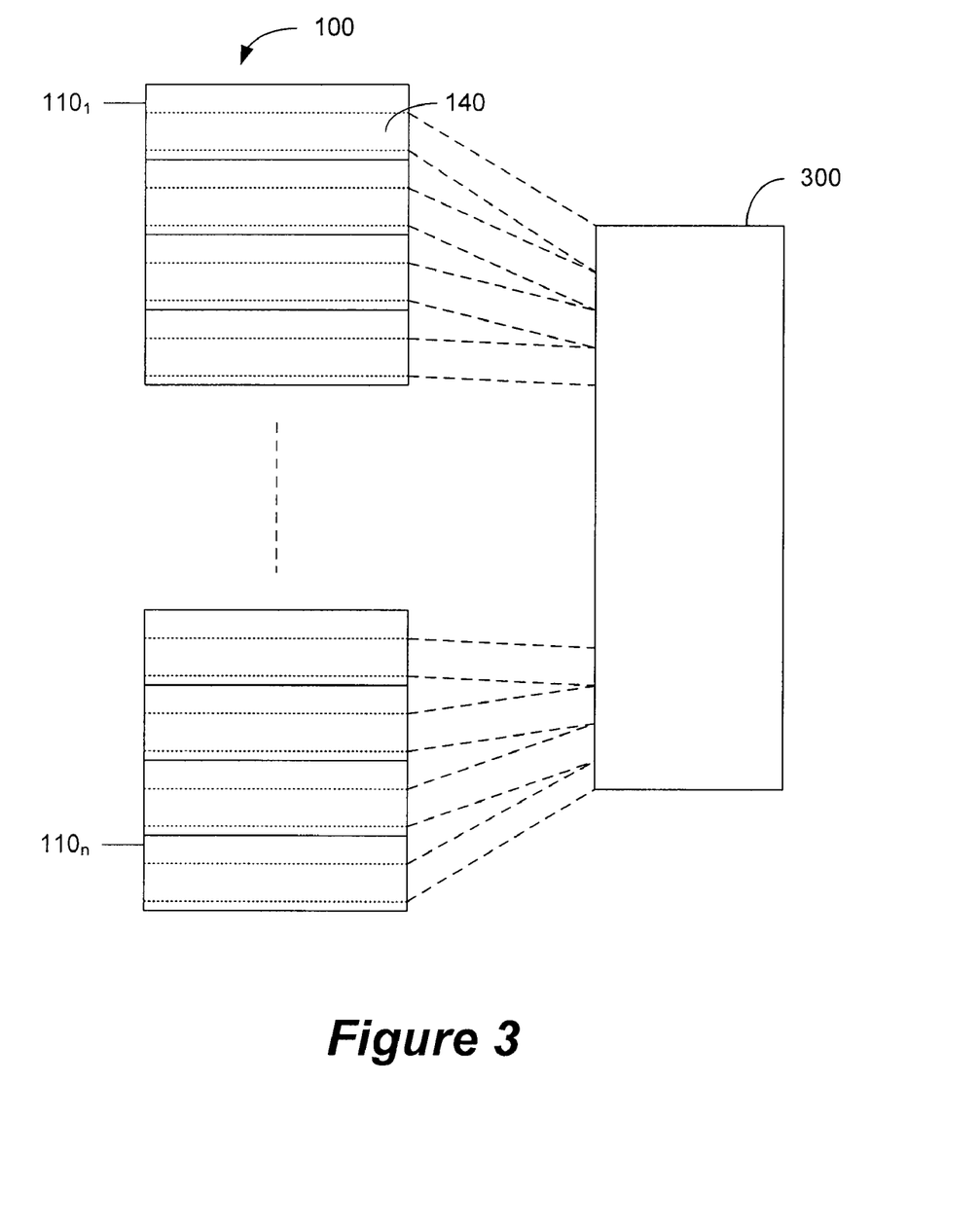
FIG. 3 shows an embodiment of an improved banking scheme.

FIG. 3 shows an exemplary embodiment using the memory bank organization as shown in FIG. 1. The physical memory space is again designated with numeral 100. In this embodiment, each or most of the memory banks $110_1 \ldots 110_n$ comprise a memory section 140 which only encompasses a part of each memory bank wherein the rest of the memory bank may be used for a designated purpose such as the mapping of special function registers or common memory. However, in other embodiments, not all memory banks may be equally organized and share the same memory areas 120-150. For example, there may be one or more memory banks reserved for special functions which contain a unique virtual or physical memory mapping to certain registers. For example FIG. 3 shows an 8-bit microcontroller using a banking scheme 200 with 32 memory banks wherein each bank comprises 128 bytes. The first 31 banks 0-30 are organized identical. Similar as shown in FIG. 1, each bank 0-30 includes memory bank areas 120, 130, 140 and 150. Bank 31 comprises partly different and additional special function registers and debugging registers mapped to the area of the peripheral SFR 130 and GPR 140.

Figure 2:
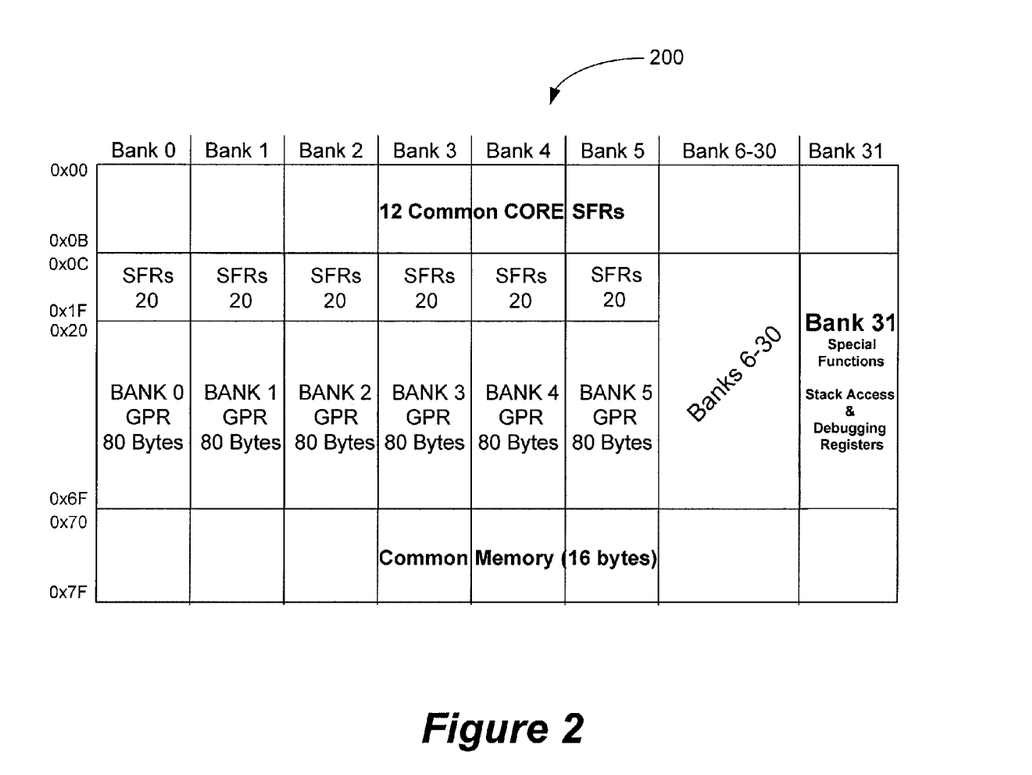
FIG. 2 shows an embodiment with a banking scheme having 32 banks.

According to one embodiment, the memory sections 140 are memory mapped to a specific memory area within the virtual memory space forming a continuous memory block 300 as shown in FIG. 3. According to other embodiments other parts of each banks such as memory area 150 or any other partial memory area of a bank depending on its organization can be assigned to a continuous virtual memory space 300. Therefore, the mapping creates a continuous memory space 300 which can be accessed by special function registers designed to access a larger linearized memory space than the banking scheme allows. According to this mapping scheme, each memory bank when accessed still allows for conventional access to its memory area 140 through the banking scheme. However, each memory area 140 is also accessible under a second address, namely the virtual memory address, where these general purpose registers or common memory form one single continuous linearized memory space 300. In an 8-bit microprocessor/microcontroller, the registers are per definition only 8 bit wide and can therefore only address 256 different memory locations (in the embodiment shown in FIG. 2 only 128 memory locations are used for each bank, however, other designs may use more location such as 256 or even less). However, this linearized memory space 200 can be accessed by special function registers or a combination of at least two 8-bit address registers. According to other embodiments with a different bit size, the same principles apply accordingly.

Figure 4:
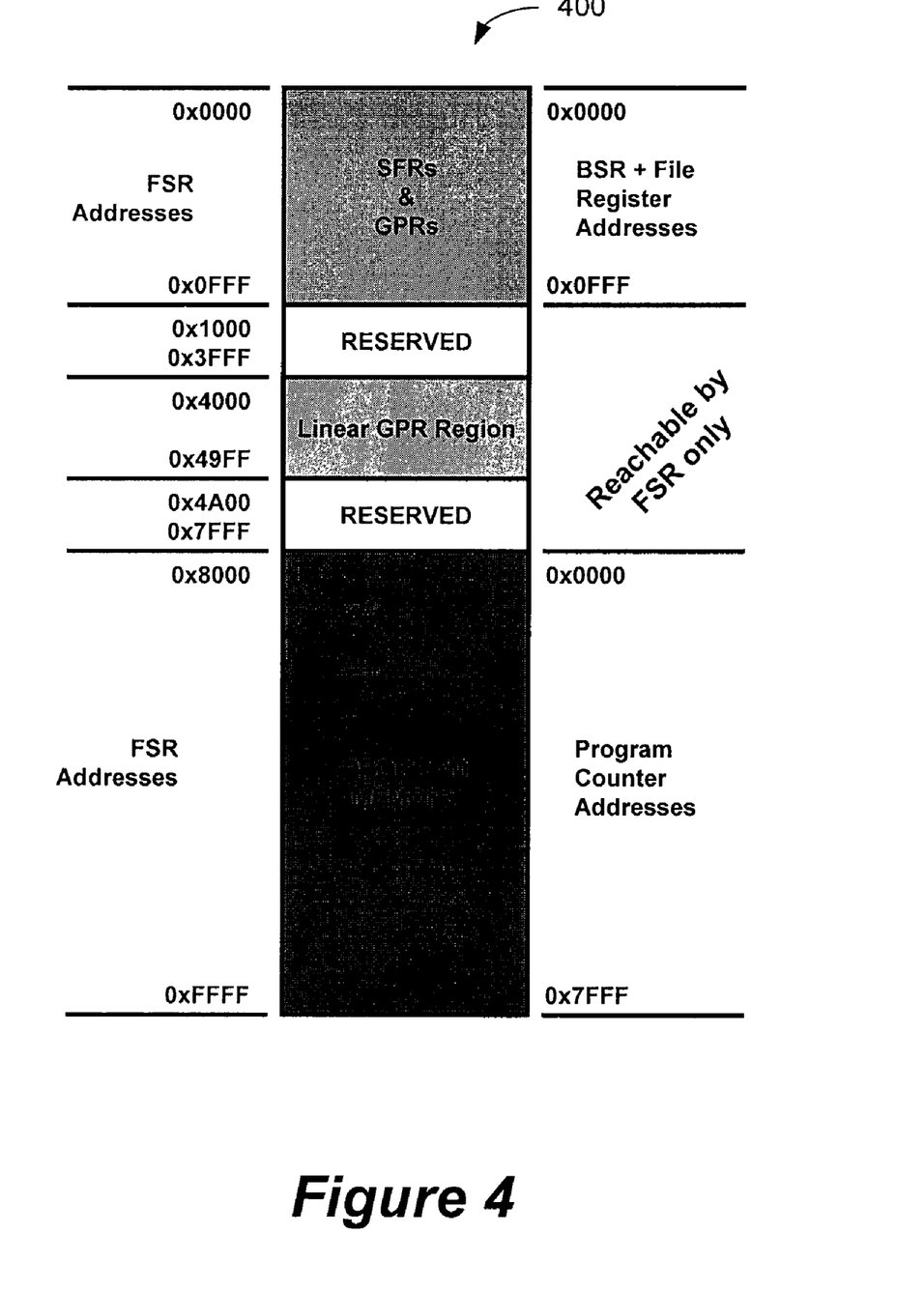
FIG. 4 shows memory mapping scheme according to an embodiment.

FIG. 4 shows an exemplary virtual memory space 400. This virtual memory space 400 may be partially identical with physical memory. For example, virtual memory area 400 starting from 0x0000 to 0x0FFF may be the actual random access memory (RAM) and virtual memory area 0x8000 to 0xFFFF may represent the actual program memory. According to this embodiment, the virtual memory area 400 with addresses 0x1000 to 0x7FFF is partially mapped to the RAM to form a continuous linearized memory block 300. For example, as shown in FIG. 4, the address range 0x4000 to 0x49FF is used to map 32 blocks of 80 bytes from each memory bank $110_1 \ldots 110_n$, wherein n=32 in this specific embodiment. However, in other embodiments n might be smaller or larger and the actual number of banks used for this mapping may be less than the available number of banks.

In the embodiment above, the 80 bytes which constitute the general purpose registers 140 in each bank are used to form a single linearized continuous memory block 300 because for many applications it can be useful to combine all general purpose registers into one uninterrupted block. However, because bank area 150 also comprises common memory area not used for general purpose register, this memory area 150 may also be used instead or in combination of the memory area 140 for forming a continuous memory block depending on the embodiment. In particular the principles according to various embodiments apply to all data memory configurations using banks that have memory mapped registers that interrupt the continuity of the remaining memory in a bank. By combining these remaining memory bank areas into a linearized memory space which is made available through virtual memory mapping, an enhancement with respect to conventional microprocessors/microcontrollers using a banking scheme can be achieved.

Figure 5:
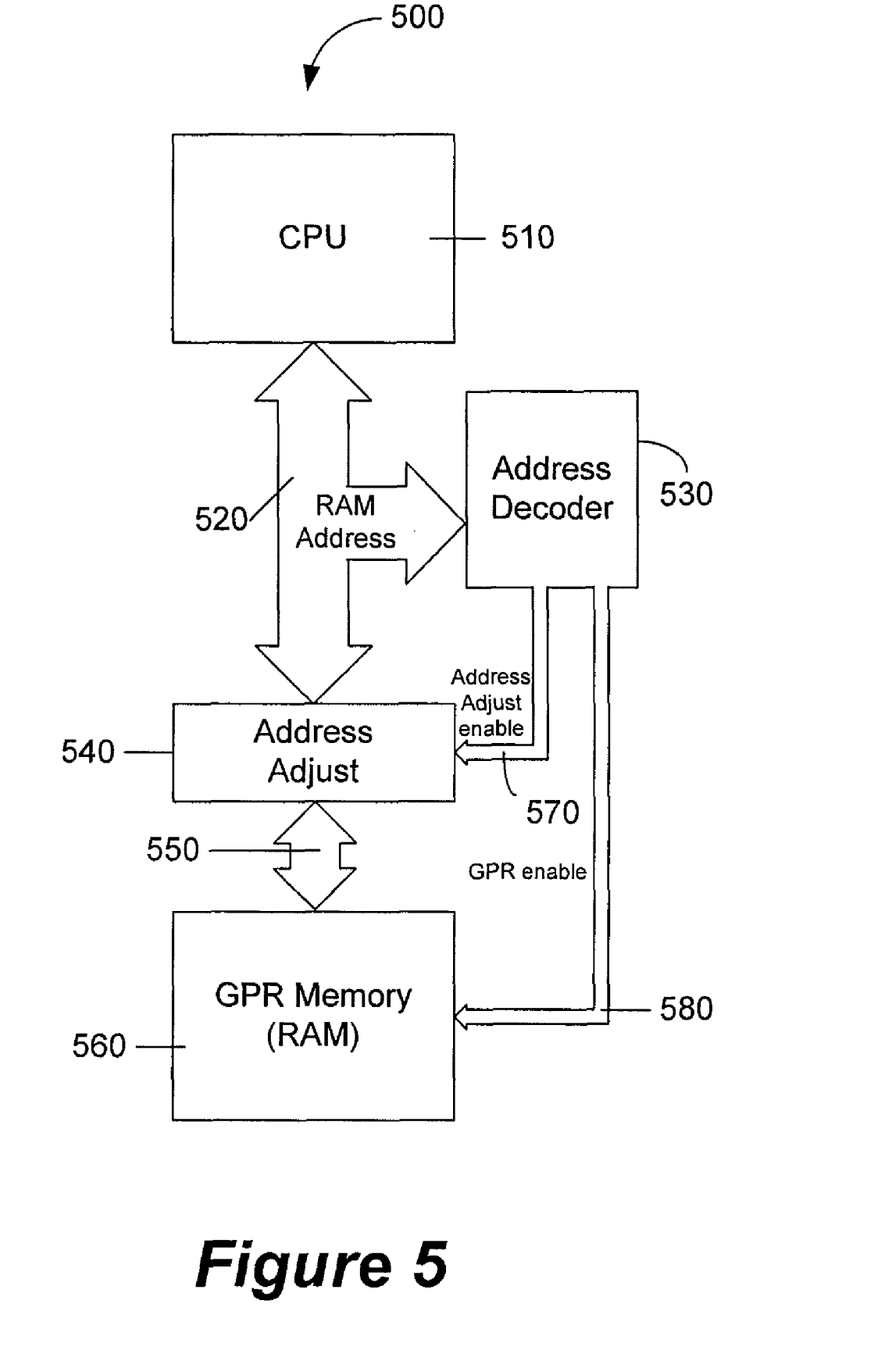
FIG. 5 shows one embodiment of an microprocessor/microcontrollers architecture for addressing a memory.

FIG. 5 shows a memory access adjustment circuit 500 that achieves the mapping as described above however, other embodiments may apply that achieve the same result. CPU 510 is coupled via address bus 520 with address decoder 530 and address adjustment unit 540. Address adjustment unit 540 is controlled by address decoder through address adjustment control lines 570. Address adjustment unit 540 is coupled with the data memory 560 through bus 550 and enabled through address decoder 530.

Generally, according the virtual addressing scheme shown in FIG. 3 and 4, if CPU 510 outputs an address, for example through an associated address register in the range 0x0000 to 0x0FFF, then address adjustment unit 540 will not be activated through address decoder 530 and merely passes the address to data memory 560 which will be enabled by address decoder 530. However, if an address is output by CPU 510 that lies within the address range 0x4000 to 0x49FF, then address decoder 530 activates address adjustment unit 540 which translates this address into the physical address of data memory 560 to access the respective memory location within the respective memory bank according to the assignment scheme shown in FIGS. 3 and 4. In another embodiment, a different address range, such as 0x2000 through 0x29FF may be used. The specific address ranges are merely shown as an example, according to various other embodiments, a user may select different address spaces with different lengths according to the respective requirements of the system. Also, multiple continuous memory blocks may be mapped depending on the respective implementation.

Figure 6:
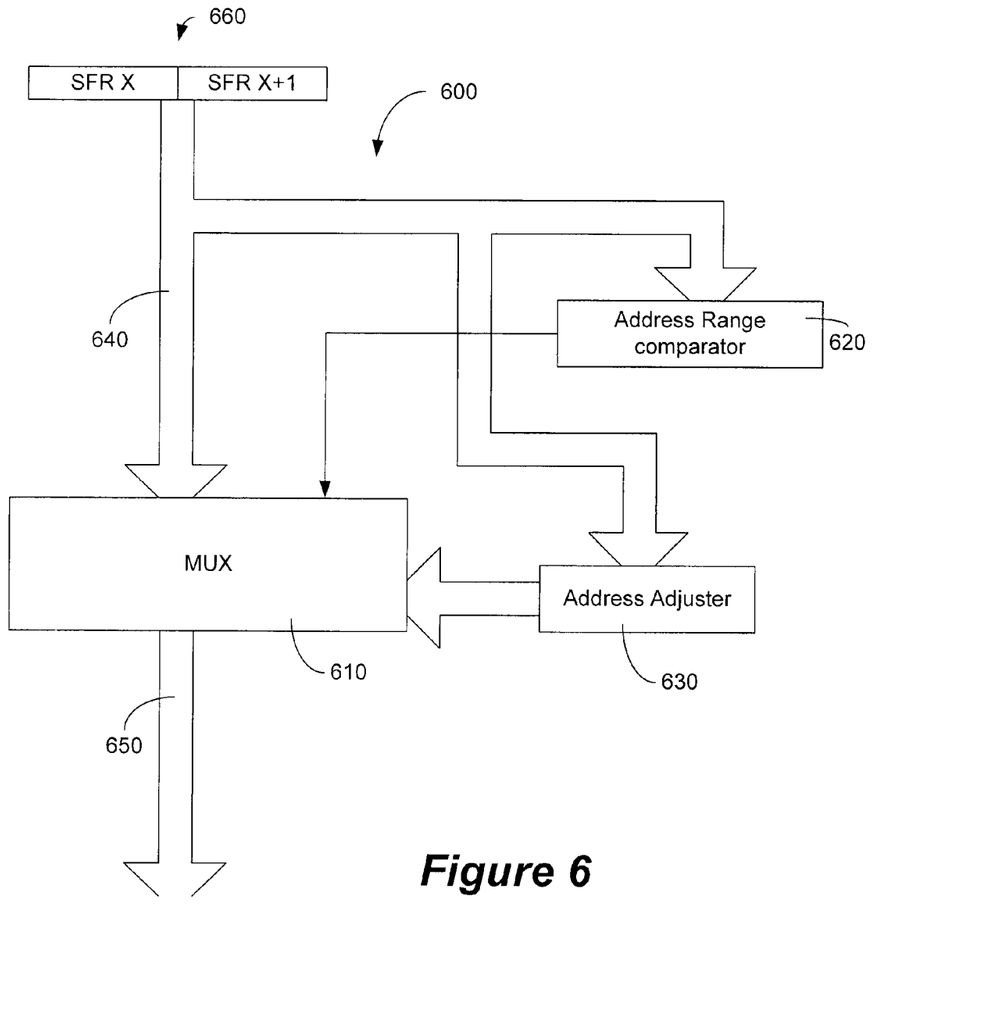
FIG. 6 shows another embodiment of an memory access circuit.

FIG. 6 shows another embodiment of a memory access adjustment circuit 600 wherein a first input of a multiplexer 610 receives the addresses from two special function registers 660 that are concatenated to form a long address capable of addressing the virtual memory bank 300. These two registers are designated as SFR X and SFR X+1 in this example. The same addresses from these registers 660 are also fed to an address range comparator 620 and an address translator 630 through bus 640. The address translator performs an address translation according to a predefined equation or algorithm that complies with the scheme shown in FIGS. 3 and 4 and forwards its output to the second input of multiplexer 610. The multiplexer 610 is controlled by address range comparator 620 which either selects the first input if the address lies within a first address range or selects the second input if the address range lies within the designated virtual address range. Multiplexer 610 outputs its addresses on address bus 650 which is coupled with the data memory. Other circuits may accomplish the same results and no design may be particularly preferred to accomplish the virtual memory mapping.

Figure 7:
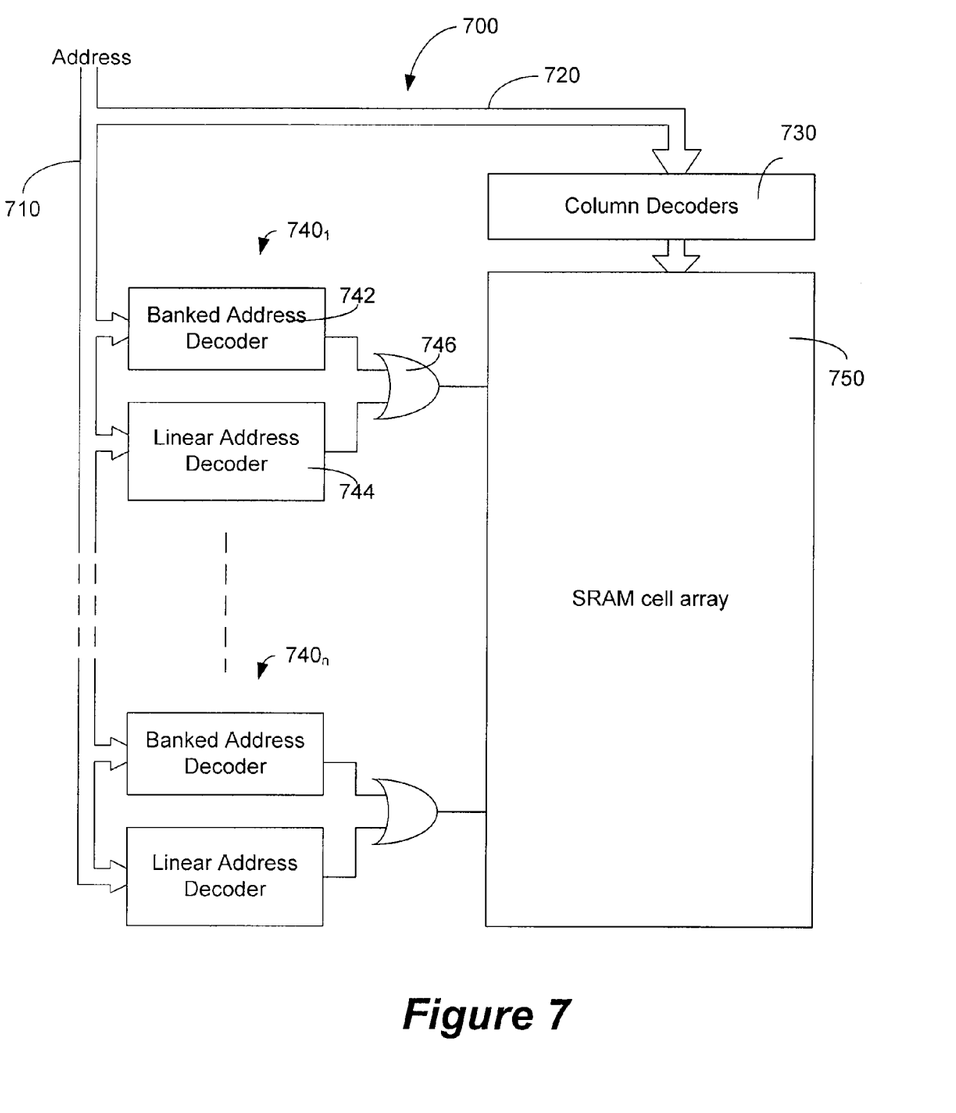
FIG. 7 shows yet another embodiment of an memory access circuit.

FIG. 7 shows yet another possibility of how to implement the memory access in a microprocessor/microcontroller. This embodiment does not make use of a virtual address space as the memory is addressable under two distinct address ranges which access different memory locations within the memory. The circuit arrangement 700 shown in FIG. 7 includes a static random access memory (SRAM) cell array 620 which uses column and row decoders as generally known in the art. However, contrary to conventional row decoders, this embodiment uses paired row decoders for each row of the SRAM cell array. Thus, the same row can be accessed under different physical addresses. The address is split in upper and lower parts and fed to the column decoders 730 through partial address bus 720 and to the row decoders pair units $740_1 \ldots 740_n$ through partial address bus 710. Each row decoder pair unit $740_1 \ldots 740_n$ comprises a banked address decoder 742 and a linear address decoder 744, the row select output signal of each these address decoders 742, 744 is fed to an OR gate 720. When operating, the plurality of address decoders detect whether a specific row of the SRAM cell array 750 has to be selected depending on the address. Thus, if an address lies within the banked memory area, for example in the range 0x0000 to 0x0FFF as shown in FIG. 4, one of the banked address decoder 742 will output a row select signal which will be fed to the SRAM cell array 750 through the respective OR gate 746. However, if the address lies, for example, within the linear memory block address 0x4000 to 0x49FF, one of the linear address decoders 744 will output a row select signal which again will be fed to SRAM cell array 750 through the respective OR gate 746 of one of the row address decoder pair units $740_1 \ldots 740_n$. The SRAM cell array 750 is organized in rows and columns such that the forming of a linearized memory block according to the scheme shown in FIG. 3 is made possible. According to other embodiments using a differently organized memory, the address decoding may be adapted accordingly to match the mapping technique as shown in FIG. 3. However, other embodiments may use different column/row select mechanism such as multiplexers, or controllable drivers.

Therefore, the present invention is well adapted to carry out the objects and attain the ends and advantages mentioned as well as those that are inherent therein. While numerous changes may be made by those skilled in the art, such changes are encompassed within the spirit of this invention as defined by the appended claims.

What is claimed is:

1. A processor device comprising:
a data memory comprising a linear address space, wherein the processor cannot address the entire linear address space and instead access the data memory through a selected one of a plurality of memory banks, wherein at least a subset of the memory banks are organized such that each memory bank of the subset comprises at least a first and second memory area, wherein no consecutive memory block is formed by the second memory areas of a plurality of consecutive memory banks;
a bank select register;
an address adjustment unit which, when a predefined address range is used, translates an address within the address range to access said second memory areas such that through the address a plurality of second memory areas form a continuous linear memory block.

2. The processor according to claim 1, further comprising an address decoder for activating the address adjustment unit.

3. The processor according to claim 1, further comprising a multiplexer having first and second inputs receiving an address and an adjusted address and being controlled by an address comparator receiving said address.

4. The processor according to claim 1, wherein said first memory area comprises special function registers.

5. The processor according to claim 1, wherein said second memory area comprises general purpose registers.

6. The processor according to claim 1, wherein said second memory area comprises common memory area.

7. The processor according to claim 4, wherein said second memory area comprises general purpose registers.

8. The processor according to claim 1, wherein the processor is a microcontroller or a microprocessor.

9. The processor according to claim 1, wherein said first memory area comprises core special function registers and wherein each memory bank of the subset comprises a third memory area comprising special function registers for peripheral devices.

10. The processor according to claim 1, wherein the address adjustment unit comprises a first decoder unit for accessing a column of memory cell array and a plurality of row decoder pairs, wherein each row decoder pair is associated with a row of the memory cell array and comprises a first row decoder and a second row decoder.

11. The processor according to claim 10, wherein one of said row decoders responds to said address.

12. The processor according to claim 10, wherein each row decoder outputs a row select signal which is combined through an OR gate coupled with the memory cell array.

13. A processor device comprising:
a data memory comprising a linear address space, wherein the processor cannot address the entire linear address space and instead access the data memory through a selected one of a plurality of memory banks,
a plurality of special function registers, wherein at least two special function registers are used to form a concatenated address;
a first address space to which a physical data memory is mapped and a second address space to which partial memory address areas of a plurality of memory banks are memory mapped consecutively such that the partial memory address areas of the plurality of memory banks form a continuous linear memory block.

14. The processor according to claim 13, further comprising an address adjustment unit translating an address addressing said liner memory block into a physical address.

15. The processor according to claim 13, wherein a memory bank includes a first memory area comprising special function registers and a second memory area comprising general purpose registers and wherein said second memory area forms said partial memory address area.

16. The processor according to claim 13, wherein a partial memory address area of a memory bank comprises memory used as common memory area.

17. The processor according to claim 13, wherein the processor is a microcontroller or a microprocessor.

18. The processor according to claim 13, wherein the data memory is a memory cell array and the processor device further comprises a first decoder unit for accessing a column of memory cell array and a plurality of row decoder pairs, wherein each row decoder pair is associated with a row of the memory cell array and comprises a first row decoder and a second row decoder.

19. The processor according to claim 18, wherein the first row decoders respond to addresses within said first address space and the second row decoders respond to addresses within said second address space.

20. The processor according to claim 18, wherein each row decoder outputs a row select signal which is combined through an OR gate coupled with the memory cell array.

21. A method of accessing data memory in a processor using a memory banking access scheme, the method comprising the steps of:
dividing a data memory into a plurality of memory banks, wherein a central processing unit accesses said data memory directly through one of said memory banks;
accessing a continuous memory block within said data memory indirectly through concatenated address register, wherein the memory block is formed by a plurality of partial memory areas of at least a subset of memory banks which are non-continuous in a physical memory space but are mapped to another memory space consecutively such that they form the continuous memory block.

22. The method according to claim 21, wherein the subset has less memory banks than the plurality of memory banks.

23. The method according to claim 21, wherein the continuous memory block is formed by partial memory areas of all memory banks.

24. The method according to claim 21, wherein a memory bank comprises a first memory area comprising special function registers and a second memory area comprising general purpose registers wherein the partial memory areas are formed by said second memory areas.

25. The method according to claim 21, wherein a partial memory area of a memory bank comprises memory used as common memory area.

26. The method according to claim 21, wherein in at least the subset of memory banks, each memory bank comprises special function registers, general purpose registers, and common memory area.

* * * * *